United States Patent
Mohrschladt et al.

(12)

(10) Patent No.: US 6,310,173 B1
(45) Date of Patent: *Oct. 30, 2001

(54) BATCH PROCESS FOR PRODUCING POLYAMIDES FROM AMINONITRILES

(75) Inventors: Ralf Mohrschladt, Schwetzingen; Volker Hildebrandt, Mannheim, both of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/600,312

(22) PCT Filed: Jan. 25, 1999

(86) PCT No.: PCT/EP99/00456

§ 371 Date: Jul. 13, 2000

§ 102(e) Date: Jul. 13, 2000

(87) PCT Pub. No.: WO99/38905

PCT Pub. Date: Aug. 5, 1999

(30) Foreign Application Priority Data

Feb. 2, 1998 (DE) ............................................. 198 04 014

(51) Int. Cl.⁷ ................................................... C08G 69/00
(52) U.S. Cl. ......................... 528/310; 528/312; 528/313; 528/329.1; 528/342; 528/324
(58) Field of Search ..................... 528/313, 310, 528/312, 329.1, 342, 324

(56) References Cited

U.S. PATENT DOCUMENTS

| | | |
|---|---|---|
| 4,568,736 | 2/1986 | Curatolo et al. ..................... 528/313 |
| 4,629,776 | 12/1986 | Curatolo et al. ..................... 528/313 |

FOREIGN PATENT DOCUMENTS

| | | |
|---|---|---|
| 35 34 817 | 4/1987 | (DE) . |
| 4339648 | 5/1995 | (DE) . |
| 479 306 | 4/1992 | (EP) . |
| 227 866 | 7/1997 | (EP) . |

Primary Examiner—P. Hampton-Hightower
(74) Attorney, Agent, or Firm—Keil & Weinkauf

(57) ABSTRACT

The batch process for producing a polyamide by reaction of a mixture comprising at least one aminonitrile, and optionally monomers useful for polyamide production, with water, comprises the following steps:

(1) reacting the mixture with water at a temperature from 90 to 400° C. and a pressure from 0.1 to $35 \times 10^6$ Pa to obtain a reaction mixture, (2) further reacting the reaction mixture at a temperature from 150 to 400° C. and a pressure which is lower than the pressure in step 1, the temperature and pressure being selected so as to obtain a first gas phase and a first liquid or a first solid phase or a mixture of first solid and first liquid phase, and the first gas phase is separated from the first liquid or the first solid phase or from the mixture of first liquid and first solid phase, and (3) admixing the first liquid or the first solid phase or the mixture of first liquid and first solid phase with a gaseous or liquid phase comprising water at a temperature from 150 to 370° C. and a pressure from 0.1 to $30 \times 10^6$ Pa to obtain a product mixture, wherein step (1) is carried out in the presence of a Brönsted acid catalyst selected from a beta-zeolite catalyst, a sheet-silicate catalyst or a fixed bed catalyst consisting essentially of $TiO_2$ comprising from 70 to 100% by weight of anatase and from 0 to 30% by weight of rutile and in which up to 40% by weight of the titanium dioxide may be replaced by tungsten oxide, and steps (2) and (3) may be carried out in the presence of this catalyst.

11 Claims, No Drawings

BATCH PROCESS FOR PRODUCING POLYAMIDES FROM AMINONITRILES

The present invention relates to a batch process for producing polyamides from aminonitriles and water at elevated temperature and elevated pressure in the presence of a catalyst.

PRIOR ART

U.S. Pat. No. 4,629,776 describes a catalytic process for producing polyamides from ω-aminonitriles such as ω-amino-capronitrile (ACN). ACN is reacted with water in the presence of a catalytic amount of an oxidized sulfur compound as catalyst. Sulfuric acid is an example of the catalyst used.

U.S. Pat. No. 4,568,736 describes a similar catalytic process for producing polyamides. The catalyst used in this case is an oxygen-containing phosphorus compound, phosphoric acid or a phosphonic acid.

Complete removal of catalyst is practically not possible in either process. The presence of catalyst in the polymer can hinder the building of high molecular weight polymers and compromise later processing operations, for example spinning. Moreover, the level of volatiles in the polymers obtained is high, so that the polyamides are difficult to process.

EP-A-0 479 306 describes the production of polyamides from ω-aminonitriles. The ω-aminonitriles are reacted with water in the presence of an oxygen-containing phosphorus compound as catalyst. Once a reaction temperature from 200 to 260° C. has been obtained, ammonia and water are continuously removed by decompressing and at the same time water is continuously added, the pressure being selected within the range from 14 to $24 \times 10^6$ Pa (14–24 bar).

DE-A-43 39 648 relates to a process for producing caprolactam by reacting aminocarbonitriles with water in the liquid phase using heterogeneous catalysts. Suitable heterogeneous catalysts include acidic, basic or amphoteric oxides of the elements of main groups 2, 3 and 4 of the Periodic Table. Titanium dioxide can be used, for example. The catalyst is used in the form of extrudates, for example.

SUMMARY OF THE INVENTION

It is an object of the present invention to provide a process for producing polyamides from aminonitriles with improved hydrolysis of the reactants, especially of the acid amide groups, and improved molecular weight buildup. The catalyst used shall be very substantially removable from the reaction mixture and have high activity. In addition, the temperability of the polyamides obtained shall be improved.

DETAILED DESCRIPTION

We have found that this object is achieved according to the invention by a batch process for producing a polyamide by reaction of a mixture comprising at least one aminonitrile, and optionally monomers useful for polyamide production, with water, which comprises the following steps:

(1) reacting the mixture with water at a temperature from 90 to 400° C. and a pressure from 0.1 to $35 \times 10^6$ Pa to obtain a reaction mixture, (2) further reacting the reaction mixture at a temperature from 150 to 400° C. and a pressure which is lower than the pressure in step 1, the temperature and pressure being selected so as to obtain a first gas phase and a first liquid or a first solid phase or a mixture of first solid and first liquid phase, and the first gas phase is separated from the first liquid or the first solid phase or from the mixture of first liquid and first solid phase, and (3) admixing the first liquid or the first solid phase or the mixture of first liquid and first solid phase with a gaseous or liquid phase comprising water at a temperature from 150 to 370° C. and a pressure from 0.1 to $30 \times 10^6$ Pa to obtain a product mixture, (4) postcondensing the product mixture at a temperature from 200 to 350° C. and a pressure which is lower than the pressure of step 3, the temperature and pressure being selected so as to obtain a second, water- and ammonia-comprising gas phase and a second liquid or second solid phase or a mixture of second liquid and second solid phase, which each comprise the polyamide, wherein step (1) is carried out in the presence of a Brönsted acid catalyst selected from a beta-zeolite catalyst, a sheet-silicate catalyst or a fixed bed catalyst consisting essentially of $TiO_2$ comprising from 70 to 100% by weight of anatase and from 0 to 30% by weight of rutile and in which up to 40% by weight of the titanium dioxide may be replaced by tungsten oxide, and steps (2) and (3) may be carried out in the presence of this catalyst.

Preferably, in the above process, in step (3), the gaseous or liquid phase comprising water is added in an amount from 50 to 1500 ml of water per 1 kg of first liquid or first solid phase or mixture of first liquid and first solid phase.

The present invention further provides a process for producing a polyamide by reaction of a mixture comprising at least one aminonitrile, and optionally monomers useful for polyamide production, with water, which comprises the following steps:

(1) reacting the mixture with water at a temperature from 90 to 400° C. and a pressure from 0.1 to $35 \times 10^5$ Pa to obtain a reaction mixture, (2) further reacting the reaction mixture at a temperature from 150 to 400° C. and a pressure which is lower than the pressure in step 1, the temperature and pressure being selected so as to obtain a first gas phase and a first liquid or a first solid phase or a mixture of first solid and first liquid phase, and the first gas phase is separated from the first liquid or the first solid phase or from the mixture of first liquid and first solid phase, and (3) postcondensing the first liquid or the first solid phase or the mixture of first liquid and first solid phase at a temperature from 200 to 350° C. and a pressure which is lower than the pressure of step 3, the temperature and pressure being selected so as to obtain a second, water- and ammonia-comprising gas phase and a second liquid or second solid phase or a mixture of second liquid and second solid phase, which each comprise the polyamide, wherein step (1) is carried out in the presence of a Brönsted acid catalyst selected from a beta-zeolite catalyst, a sheet-silicate catalyst or a fixed bed catalyst consisting essentially of $TiO_2$ comprising from 70 to 100% by weight of anatase and from 0 to 30% by weight of rutile and in which up to 40% by weight of the titanium dioxide may be replaced by tungsten oxide, and step (2) may be carried out in the presence of this catalyst.

The principle of the process of the invention is described in DE-A-197 09 390, unpublished at the priority date of the present invention.

The aminonitrile in the mixture can be in principle any aminonitrile, i.e., any compound having both at least one amino group and at least one nitrile group. ω-Amino-nitriles are preferred, especially ω-aminoalkyl nitriles having from 4 to 12 carbon atoms, more preferably 4 to 9 carbon atoms, in the alkylene moiety, or an aminoalkyl-aryl nitrile having from 8 to 13 carbon atoms, preferred aminoalkylaryl nitrites being aminoalkylaryl nitrites which have an alkylene group of at least one carbon atom between the aromatic unit and the amino and nitrile group. Especially preferred aminoalkylaryl nitrites are those which have the amino group and nitrile group in the 1,4 position relative to each other.

The ω-aminoalkyl nitrile used is preferably a linear ω-aminoalkyl nitrile in which the alkylene moiety ($-CH_2-$) preferably contains from 4 to 12 carbon atoms, more preferably from 4 to 9 carbon atoms, such as 6-amino-1-cyanopentane (6-aminocapronitrile), 7-amino-1-cyanohexane, 8-amino-1-cyanoheptane, 9-amino-1-cyanooctane, 10-amino-1-cyanononane, particularly preferably 6-aminocapronitrile.

6-Aminocapronitrile is customarily obtained by hydrogenation of adiponitrile according to known methods, described for example in DE-A 836,938, DE-A 848,654 or U.S. Pat. No. 5,151,543.

Of course, it is also possible to use mixtures of a plurality of aminonitriles or mixtures of an aminonitrile with further comonomers, such as caprolactam or the below-defined mixture.

In a particular embodiment, especially if copolyamides or branched or chain-lengthened polyamides are to be prepared, the following mixture is used instead of pure 6-aminocapronitrile:

from 50 to 99.9, preferably from 80 to 90, % by weight of 6-aminocapronitrile, from 0.01 to 50, preferably from 1 to 30, % by weight of at least one dicarboxylic acid selected from the group consisting of aliphatic $C_4-C_{10}$-α-ω-dicarboxylic acids, aromatic $C_8-C_{12}$-dicarboxylic acids and $C_5-C_8$-cycloalkane-dicarboxylic acids, from 0 to 50, preferably from 0.1 to 30, % by weight of an α, ω-diamine having from 4 to 10 carbon atoms, from 0.01 to 50, preferably from 0 to 30, % by weight of an α, ω-$C_2-C_{12}$-dinitrile, and from 0 to 50, preferably from 0 to 30, % by weight of an α, ω-$C_5-C_{12}$-amino acid or of the corresponding lactam, from 0 to 10% by weight of at least one inorganic acid or salt thereof, the individual weight percentages adding up to 100%.

Suitable dicarboxylic acids include aliphatic $C_4-C_{10}$-α,ω-dicarboxylic acids such as succinic acid, glutaric acid, adipic acid, pimelic acid, suberic acid, azelaic acid, sebacic acid, preferably adipic acid and sebacic acid, particularly preferably adipic acid, and aromatic $C_8-C_{12}$-dicarboxylic acids such as terephthalic acid and also $C_5-C_8$-cycloalkanedicarboxylic acids such as cyclohexanedicarboxylic acid.

Suitable α, ω-diamines having from 4 to 10 carbon atoms include tetramethylenediamine, pentamethylenediamine, hexamethylenediamine, heptamethylenediamine, octamethylenediamine, nonamethylenediamine and decamethylenediamine, preferably hexamethylenediamine.

It is further also possible to use salts of the aforementioned dicarboxylic acids and diamines, especially the salt of adipic acid and hexamethylenediamine, which is known as 66 salt.

The α, ω-$C_2-C_{12}$-dinitrile used is preferably an aliphatic dinitrile such as 1,4-dicyanobutane (adiponitrile), 1,5-dicyanopentane, 1,6-dicyanohexane, 1,7-dicyanoheptane, 1,8-dicyanooctane, 1,9-dicyanononane, 1,10-dicyanodecane, particularly preferably adiponitrile.

If desired, it is also possible to use diamines, dinitriles and aminonitriles derived from branched alkylene or arylene or alkylarylene compounds.

The α, ω-$C_5-C_{12}$-amino acid used can be 5-aminopentanoic acid, 6-aminohexanoic acid, 7-aminoheptanoic acid, 8-aminooctanoic acid, 9-aminononanoic acid, 10-aminodecanoic acid, 11-aminoundecanoic acid or 12-aminododecanoic acid, preferably 6-aminohexanoic acid.

According to the invention, the first step (step 1) involves heating an aminonitrile with water at a temperature from 90 to 400° C., preferably about 180 to 310° C., especially at 220 to 270° C., a pressure from 0.1 to $15 \times 10^6$ Pa, preferably 1 to $10 \times 10^6$ Pa, especially 4 to $9 \times 10^6$ Pa, being set. In this step, the pressure and the temperature can be adjusted relative to each other in such a way as to obtain a liquid or a solid phase and a mixture of liquid or solid phase and a gaseous phase.

According to the invention, water is used in a molar ratio of aminoalkyl nitrile to water within the range from 1:1 to 1:10, particularly preferably within the range from 1:2 to 1:8, very particularly preferably within the range from 1:2 to 1:6, preference being given to the use of water in excess, based on the aminoalkyl nitrile used.

In this embodiment, the liquid or solid phase or the mixture of liquid and solid phase corresponds to the reaction mixture, whereas the gaseous phase is separated off. As part of this step, the gaseous phase can be separated from the liquid or solid phase or from the mixture of solid or liquid phase at once, or the synthesis mixture forming within this step can be present in two-phase form: liquid/gaseous, solid/gaseous or liquid-solid/gaseous. The pressure and temperature can also be adjusted relative to each other in such a way that the synthesis mixture is present as a single solid or liquid phase.

The removal of the gas phase can be effected by the use of stirred or unstirred separating tanks or tank batteries and by the use of evaporator apparatus, for example by means of circulatory evaporators or thin-film evaporators, as by film extruders, or by means of annular disk reactors, which ensure an enlarged phase interface. In certain cases, recirculation of the synthesis mixture or the use of a loop reactor may be necessary to increase the phase interface. Furthermore, the removal of the gas phase can be furthered by the addition of water vapor or inert gas into the liquid phase.

Preferably, the pressure is adjusted at a preselected temperature so that the pressure is smaller than the equilibrium vapor pressure of ammonia, but greater than the equilibrium vapor pressure of the other components in the synthesis mixture at the given temperature. This way, it is possible to favor especially the removal of ammonia and thus speed up the hydrolysis of the acid amide groups.

Step 1 can be carried out using stirred tanks or tank batteries. A two-phase procedure is preferably carried out using tanks or a reaction column.

As regards the residence time of the synthesis mixture in the first step, there are no restrictions whatsoever; however, it is generally set within the range from about 10 minutes to about 10 hours, preferably within the range from about 30 minutes to about 6 hours.

Although there are no restrictions whatsoever concerning the degree of conversion of nitrile groups in step 1 either, economic reasons especially dictate that the conversion of nitrile groups in step 1 be generally not less than about 70 mol %, preferably at least about 95 mol %, and especially within the range from about 97 to about 99 mol %, based in each case on the moles of aminonitrile used.

The nitrile group conversion is customarily determined by means of IR spectroscopy (CN stretching vibration at 2247 wavenumbers), NMR or HPLC, preferably by IR spectroscopy.

In a further preferred embodiment, the amino nitrile/water mixture is continuously heated with the aid of a heat exchanger and the mixture thus heated is introduced into a reaction vessel heated to the same temperature. Of course, the aminonitrile and the water can also be heated up separately.

Nor does the invention rule out conducting the reaction in step 1 in the presence of oxygen-containing phosphorus compounds, especially phosphoric acid, phosphorous acid and hypophosphorous acid and their alkali metal and alkaline earth metal salts and ammonium salts such as $Na_3PO_4$, $NaH_2PO_4$, $Na_2HPO_4$, $NaH_2PO_3$, $Na_2HPO_3$, $NaH_2PO_2$, $K_3PO_4$, $KH_2PO_4$, $K_2HPO_4$, $K_2HPO_3$, $K_2HPO_3$, $KH_2PO_2$, in which case the molar ratio of ω-aminonitrile to phosphorus compounds is selected within the range from 0.01:1 to 1:1, preferably within the range from 0.01:1 to 0.1:1.

According to the invention, step (1) and optionally step (2) and/or step (3) are carried out in the presence of a Brönsted acid catalyst selected from a beta-zeolite catalyst, a sheet-silicate catalyst or a fixed bed catalyst consisting essentially of $TiO_2$ comprising from 70 to 100% by weight of anatase and from 0 to 30% by weight of rutile and in which up to 40% by weight of the titanium dioxide may be replaced by tungsten oxide. Step (4) is preferably carried out without the use of the fixed bed catalyst. The heterogeneous catalyst is easy to remove from the synthesis mixture prior to the postcondensation in step (4), since the viscosity of the synthesis mixture is still relatively low. This permits an at least substantial, preferably complete, separation of catalyst and product mixture.

A catalyst having a high anatase content is particularly suitable when the aminocapronitrile (ACN) used is pure, i.e., includes a very low level of impurities, if any. Such a catalyst preferably comprises from 80 to 100% by weight of anatase and from 0 to 20% by weight of rutile, and preferably it consists essentially or completely of anatase. If impure aminocapronitrile including about 1–3% by weight of impurities is used, it is preferable to employ a catalyst having a higher rutile content. A preferred catalyst comprises from 70 to 80% by weight of anatase and from 20 to 30% by weight of rutile, preferably about 30% by weight of rutile.

The catalyst preferably has a pore volume of from 0.1 to 5 ml/g, particularly preferably from 0.2 to 0.5 ml/g. The average pore diameter is preferably within the range from 0.005 to 0.1 μm, particularly preferably within the range from 0.01 to 0.06 μm. If highly viscous products are used, the average pore diameter should be large. The cutting hardness is preferably greater than 20 N, particularly preferably >25 N. The BET surface area is preferably more than 40 m²/g, particularly preferably more than 100 m²/g. If the BET surface area is smaller, the bed volume should be appropriately higher to ensure adequate catalyst activity. Particularly preferred catalysts have the following properties: 100% of anatase; 0.3 ml/g pore volume; 0.02 μm average pore diameter; 32 N cutting hardness; 116 m²/g BET surface area or 84% by weight of anatase; 16% by weight of rutile; 0.3 ml/g pore volume; 0.03 μm average pore diameter; 26 N cutting hardness; 46 m²/g BET surface area. The catalysts may be prepared from commercial powders as available for example from Degussa, Finti or Kemira. When tungsten oxide is used, up to 40% by weight, preferably up to 30% by weight, particularly preferably from 15 to 25% by weight of the titanium dioxide is replaced by tungsten oxide. The catalysts can be prepared as described in Ertl, Knözinger, Weitkamp: "Handbook of heterogeneous catalysis", VCH Weinheim, 1997, pages 98ff.

The batch process of the invention is preferably carried out in 3 or 4 steps in a closed reaction system. The individual synthesis steps are described in more detail below.

It is possible to use concentrated synthesis mixtures having a weight ratio of aminocapronitrile to water within the range from 1:1 to 1:10.

According to the invention, the reaction mixture obtained in the first step is further reacted in step 2 at a temperature from about 150(200) to about 400(350)° C., preferably at a temperature within the range from about 100 to about 330(300)° C., especially within the range from about 230 to about 290(270)° C., and a pressure which is lower than the pressure in step 1. The pressure in the second step is preferably at least about $0.5 \times 10^6$ Pa lower than the pressure in step 1, and generally the pressure will be within the range from about 0.01 to about $45 \times 10^6$ Pa, preferably within the range from about 0.5 to about $15 \times 10^6$ Pa, especially within the range from about 2 to about $6 \times 10^6$ Pa (values in brackets; with catalyst).

In step 2, the temperature and the pressure are chosen so as to obtain a first gas phase and a first liquid or first solid phase or a mixture of first liquid and first solid phase and the first gas phase is separated from the first liquid or first solid phase or from the mixture of first liquid and first solid phase.

The first gaseous phase, which consists essentially of ammonia and water vapor, is generally removed continuously by means of a distillation apparatus, such as a distillation column. Any organic constituents of the distillate coremoved in the course of this distillation, predominantly unconverted aminonitrile, can be wholly or partly recycled into step 1 and/or step 2.

The residence time of the reaction mixture in step 2 is not subject to any restrictions whatsoever, but is generally within the range from about 10 minutes to about 5 hours, preferably within the range from about 30 minutes to about 3 hours.

The product line between the first and second steps optionally contains packing elements, for example Raschig rings or Sulzer mixing elements, which facilitate a controlled expansion of the reaction mixture into the gas phase.

In step 3, the first liquid or the first solid phase or the mixture of first liquid and first solid phase is admixed with a gaseous or liquid phase comprising an aqueous medium, preferably water or water vapor. The amount of water added (as liquid) is preferably within the range from about 50 to about 1500 ml, more preferably within the range from about 100 to about 500 ml, based in each case on 1 kg of the first liquid or first solid phase or of the mixture of first liquid and first solid phase. This addition of water primarily compensates the water losses incurred in step 2 and furthers the hydrolysis of acid amide groups in the synthesis mixture. This results in a further advantage of this invention, that the mixture of the starting materials as used in step 1 can be used with a small excess of water only.

The gaseous or liquid phase comprising water is preferably preheated in a heat exchanger before being introduced into step 3 and then mixed with the first liquid or the first solid phase or the mixture of first solid and first liquid phase.

The reactor may optionally be fitted with mixing elements which further the mixing of the components.

Step 3 is operated at a temperature from 150 to 370° C., preferably 180 to 300° C., particularly preferably 220 to 280° C. and a pressure from 0.1 to 30×10$^6$ Pa, preferably 1 to 10×10$^6$ Pa, particularly preferably 2 to 7×10$^6$ Pa.

The pressure and temperature can be adjusted to each other in such a way that the synthesis mixture is present as a single liquid or solid phase. In another embodiment, the pressure and temperature are selected so that a liquid or a solid phase or a mixture of solid and liquid phase and also a gaseous phase are obtained. In this embodiment, the liquid or solid phase or the mixture of liquid and solid phase corresponds to the product mixture, whereas the gaseous phase is separated off. As part of this step, the gaseous phase can be separated from the liquid or solid phase or from the mixture of solid or liquid phase at once, or the synthesis mixture forming within this step can be present in two-phase form: liquid/gaseous, solid/gaseous or liquid-solid/gaseous.

The pressure can be adjusted at a preselected temperature so that the pressure is smaller than the equilibrium vapor pressure of ammonia, but greater than the equilibrium vapor pressure of the other components in the synthesis mixture at the given temperature. This way, it is possible to favor especially the removal of ammonia and thus speed up the hydrolysis of the acid amide groups.

The apparatus/reactors usable in this step can be identical with those of step 1, as discussed above.

The residence time of the third step is likewise not subject to any restrictions, but economic reasons generally dictate a range from about 10 minutes to about 10 hours, preferably from about 6 to about 8 hours, particularly preferably from about 60 minutes to 6 hours.

The product mixture obtained in step 3 can be further processed as described below.

In a preferred embodiment, the product mixture of step 3 is subjected to a postcondensation in a fourth step at a temperature from about 200 to about 350° C., preferably at a temperature from about 220 to 300° C., especially from about 240 to 270° C. Step 4 is carried out at a pressure which is below the pressure of step 3 and is preferably within the range from about 5 to 1000×10$^3$ Pa, more preferably within the range from about 10 to about 300×10$^3$ Pa. In the context of this step, the temperature and pressure are selected so as to obtain a second gas phase and a second liquid or solid phase or a mixture of second liquid and second solid phase which each comprise the polyamide.

The postcondensation of step 4 is preferably carried out in such a way that the relative viscosity (measured at a temperature of 25° C. and a concentration of 1 g of polymer per 100 ml in 96% strength by weight of sulfuric acid) of the polyamide assumes a value within the range from about 1.6 to about 3.5.

In a preferred embodiment, any water present in the liquid phase can be expelled by means of an inert gas such as nitrogen.

The residence time of the reaction mixture in step 4 depends especially on the desired relative viscosity, the temperature, the pressure and the amount of water added in step 3.

If step 3 is operated as a single-phase regime, the product line between step 3 and step 4 may optionally contain packing elements, for example, Raschig rings or Sulzer mixing elements, which allow a controlled expansion of the synthesis mixture in the gas phase.

In a further embodiment of the invention, step 3 may be dispensed with and the polyamide produced by carrying out steps (1), (2) and (4).

This variant is preferably carried out as follows:

In step 1, at least one aminoalkyl nitrile is heated with an excess of water at a temperature within the range from about 220 to about 270° C. and a pressure of from about 4 to 9×10$^6$ Pa, the pressure and temperature being adjusted to each other in such a way that the synthesis mixture is present as a single liquid phase and the nitrile group conversion being not less than 95 mol %, based on the moles of aminoalkyl nitrile used, to obtain a reaction mixture.

The reaction mixture is treated in step 2 as described above or at a temperature within the range from about 220 to about 300° C. and a pressure within the range from about 1 to about 7×10$^6$ Pa, the pressure in the second step being at least 0.5×10$^6$ Pa lower than in step 1. At the same time, the resulting first gas phase is separated from the first liquid phase.

The first liquid phase obtained in step 2 is treated in step 4 as in step 1 or at a temperature within the range from about 220 to 300° C. and a pressure within the range from about 10 to about 300×10$^3$ Pa, the resulting second, water- and ammonia-comprising gas phase being separated from the second liquid phase. Within this step, the relative viscosity (measured as defined above) of the resulting polyamide is adjusted to a desired value within the range from about 1.6 to about 3.5 through choice of temperature and residence time.

The resulting second liquid phase is then conventionally discharged and, if desired, worked up.

The above-described processes, i.e., the sequence according to the invention of steps (1) to (3) or (1), (2) and (4) or (1) to (4), is preferably carried out batchwise, i.e., in succession in a single reactor.

In a further preferred embodiment of the present invention, at least one of the gas phases obtained in the respective steps can be recycled into at least one of the preceding steps.

It is further preferable to select the temperature and pressure in step 1 or in step 3 or in both step 1 and step 3 so as to obtain a liquid or a solid phase or a mixture of liquid and solid phase and a gaseous phase and to separate off the gaseous phase.

Furthermore, in the context of the process of the invention, it is also possible to carry out a chain lengthening or branching or a combination thereof. For this purpose, polymer branching or chain-lengthening substance known to a person skilled in the art are added in the individual steps. These substances are preferably added in step 3 or 4.

Usable substances are:

Trifunctional amines or carboxylic acids as branching agents or crosslinkers. Examples of suitable at least trifunctional amines or carboxylic acids are described in EP-A-0 345 648. The at least trifunctional amines have at least three amino groups which are capable of reaction with carboxylic acid groups. They preferably do not have any carboxylic acid groups. The at least trifunctional carboxylic acids have at least three carboxylic acid groups which are capable of reaction with amines and which can also be present, for example, in the form of their derivatives, such as esters. The carboxylic acids preferably do not contain any amino groups capable of reaction with carboxylic acid groups. Examples of suitable carboxylic acids are trimesic acid, trimerized fatty acids, prepared for example from oleic acid and having from 50 to 60 carbon atoms, naphthalenepolycarboxylic acids, such as naphthalene-1,3,5,7-tetracarboxylic acid. The carboxylic acids are preferably defined organic compounds and not polymeric compounds.

Examples of amines having at least 3 amino groups are nitrilotrialkylamine, especially nitrilotriethaneamine, dialkylenetriamines, especially diethylenetriamine, trialkylenetetramines and tetraalkylenepentamines, the alkylene moieties preferably being ethylene moieties. Furthermore, dendrimers can be used as amines. Dendrimers preferably have the general formula I

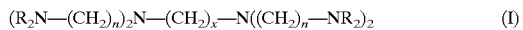

$$(R_2N-(CH_2)_n)_2N-(CH_2)_x-N((CH_2)_n-NR_2)_2 \qquad (I)$$

where

R is H or —$(CH_2)_n$—$NR^2{}_2$, where $R^1$ is H or —$(CH_2)_n$—$NR^2{}_2$, where $R^2$ is H or —$(CH_2)_n$—$NR^3{}_2$, where R is H or —$(CH_2)_n$—$NH_2$, n is an integer from 2 to 6, and x is an integer from 2 to 14.

Preferably, n is 3 or 4, especially 3, and x is an integer from 2 to 6, preferably from 2 to 4, especially 2. The radicals R can also have the stated meanings independently of one another. Preferably, R is a hydrogen atom or a —$(CH_2)_n$—$NH_2$ radical.

Suitable carboxylic acids are those having from 3 to 10 carboxylic acid groups, preferably 3 or 4 carboxylic acid groups. Preferred carboxylic acids are those having aromatic and/or heterocyclic nuclei. Examples are benzyl, naphthyl, anthracene, biphenyl, triphenyl radicals or heterocycles such as pyridine, bipyridine, pyrrole, indole, furan, thiophene, purine, quinoline, phenanthrene, porphyrin, phthalocyanine, naphthalocyanine. Preference is given to 3,5,3',5'-biphenyltetra-carboxylic acid-phthalocyanine, naphthalocyanine, 3,5,5',5'-biphenyltetracarboxylic acid, 1,3,5,7-naphthalenetetracarboxylic acid, 2,4,6-pyridinetricarboxylic acid, 3,5,3',5'-bipyridyltetracarboxylic acid, 3,5,3',5'-benzophenonetetracarboxylic acid, 1,3,6,8-acridinetetracarboxylic acid, particularly preferably 1,3,5-benzenetricarboxylic acid (trimesic acid) and 1,2,4,5-benzenetetracarboxylic acid. Such compounds are commercially available or can be prepared by the process described in DE-A-43 12 182. If ortho-substituted aromatic compounds are used, imide formation is preferably prevented through the choice of suitable reaction temperatures.

These substances are at least trifunctional, preferably at least tetrafunctional. The number of functional groups can be from 3 to 16, preferably from 4 to 10, particularly preferably from 4 to 8. The processes of the invention are carried out using either at least trifunctional amines or at least trifunctional carboxylic acids, but not mixtures of such amines or carboxylic acids. However, small amounts of at least trifunctional amines may be present in the trifunctional carboxylic acids, and vice versa.

The substances are present in an amount from 1 to 50 μmol/g of polyamide, preferably from 1 to 35, particularly preferably 1 to 20, μmol/g of polyamide. The substances are preferably present in an amount from 3 to 150, particularly preferably from 5 to 100, especially from 10 to 70, μmol of equivalents/g of polyamide. The equivalents are based on the number of functional amino groups or carboxylic acid groups.

Difunctional carboxylic acids or difunctional amines are used as chain lengtheners. These have 2 carboxylic acid groups which can be reacted with amino groups, or 2 amino groups which can be reacted with carboxylic acids. The difunctional carboxylic acids or amines, as well as the carboxylic acid groups or amino groups, do not contain any further functional groups capable of reaction with amino groups or carboxylic acid groups. Preferably, they do not contain any further functional groups. Examples of suitable difunctional amines are those which form salts with difunctional carboxylic acids. They can be linear aliphatic, such as $C_{1-14}$-alkylenediamine, preferably $C_{2-6}$-alkylenediamine, for example hexylenediamine. They can also be cycloaliphatic. Examples are isophoronediamine, dicycycan, laromine. Branched aliphatic diamines are likewise usable, an example being Vestamin TMD (trimethylhexamethylenediamine, from Hüls AG). In addition, the diamines can also be aromatic-aliphatic, it being possible to use n-xylylenediamine, for example. Entire amines can each be substituted by $C_{1-12}$-alkyl, preferably $C_{1-14}$-alkyl, radicals on the carbon skeleton.

Difunctional carboxylic acids are, for example, those which form salts with difunctional diamines. They can be linear aliphatic dicarboxylic acids, which are preferably $C_{4-20}$-dicarboxylic acids. Examples are adipic acid, azelaic acid, sebacic acid, suberic acid. They can also be aromatic. Examples are isophthalic acid, terephthalic acid, naphthalenedicarboxylic acid, as well as dimerized fatty acids.

The difunctional basic building blocks (c) are preferably used in amounts from 1 to 55, particularly preferably from 1 to 30, especially from 1 to 15, μm/g of polyamide.

According to the invention, the product mixture obtained in step 3, or the second liquid or second solid phase or the mixture of second liquid and second solid phase (from step 4) which each comprise the polyamide, preferably a polymer melt, is discharged from the reaction vessel in a conventional manner, for example by means of a pump. Subsequently, the polyamide obtained can be worked up according to conventional methods, as described for example in DE-A 43 21 683 (page 3 line 54 to page 4 line 3) at length.

In a preferred embodiment, the level of cyclic dimer in the nylon-6 obtained according to the invention can be further reduced by extracting the polyamide first with an aqueous solution of caprolactam and then with water and/or subjecting it to a gas phase extraction (described in EP-A-0 284 968, for example). The low molecular weight constituents obtained in this aftertreatment, such as caprolactam, linear caprolactam oligomer and cyclic caprolactam oligomer, can be recycled into the first and/or second and/or third step.

The starting mixture and the synthesis mixture can be admixed in all steps with chain regulators such as aliphatic and aromatic carboxylic and dicarboxylic acids and catalysts such as oxygen-containing phosphorus compounds in amounts within the range from 0.01 to 5% by weight, preferably within the range from 0.2 to 3% by weight, based on the amount of polyamide-forming monomers and aminonitriles used. Suitable chain regulators include for example propionic acid, acetic acid, benzoic acid, terephthalic acid and triacetonediamine.

Additives and fillers such as pigments, dyes and stabilizers are generally added to the synthesis mixture prior to pelletization, preferably in the second, third and fourth steps. Particular preference is given to using fillers and additives whenever the synthesis or polymer mixture will not encounter fixed bed catalysts in the rest of the processing. One or more impact-modified rubbers may be present in the compositions as additives in amounts from 0 to 40% by weight, preferably from 1 to 30% by weight, based on the entire composition.

It is possible to use, for example, customary impact modifiers which are suitable for polyamides and/or polyarylene ethers.

Rubbers which enhance the toughness of polyamides generally have two essential features: they have an elastomeric portion which has a glass transition temperature of less than −10° C., preferably less than −30° C., and they contain at least one functional group which is capable of interaction with the polyamide. Suitable functional groups include for example carboxylic acid, carboxylic anhydride, carboxylic ester, carboxylic amide, carboxylic imide, amino, hydroxyl, epoxide, urethane and oxazoline groups.

Examples of rubbers which enhance the toughness of the blends include for example:

EP and EPDM rubbers grafted with the above functional groups. Suitable grafting reagents include for example maleic anhydride, itaconic acid, acrylic acid, glycidyl acrylate and glycidyl methacrylate.

These monomers can be grafted onto the polymer in the melt or in solution, in the presence or absence of a free-radical initiator such as cumene hydroperoxide.

The copolymers of α-olefins described under the polymers A, including especially the ethylene copolymers, may also be used as rubbers instead of polymers A and be mixed as such into the compositions of the invention.

A further group of suitable elastomers are core-shell graft rubbers. These are graft rubbers which are produced in emulsion and which have at least one hard and one soft constituent. A hard component is customarily a polymer having a glass transition temperature of at least 25° C., while a soft constituent is a polymer having a glass transition temperature of not more than 0° C. These products have a structure made up of a core and at least one shell, the structure being the result of the order in which the monomers are added. The soft constituents are generally derived from butadiene, isoprene, alkyl acrylates, alkyl methacrylates or siloxanes and optionally further comonomers. Suitable siloxane cores can be prepared for example starting from cyclic oligomeric octamethyltetrasiloxane or tetravinyltetramethyltetrasiloxane. These can be for example reacted with γ-mercaptopropylmethyldimethoxysilane in a ring-opening cationic polymerization, preferably in the presence of sulfonic acids, to form the soft siloxane cores. The siloxanes can also be crosslinked by, for example, conducting the polymerization reaction in the presence of silanes having hydrolyzable groups such as halogen or alkoxy groups such as tetraethoxysilane, methyltrimethoxysilane or phenyltrimethoxysilane. Suitable comonomers here include for example styrene, acrylonitrile and crosslinking or grafting monomers having more than one polymerizable double bond such as diallyl phthalate, divinylbenzene, butanediol diacrylate or triallyl (iso)cyanurate. The hard constituents are generally derived from styrene, α-methylstyrene and copolymers thereof, preferred comonomers being acrylonitrile, methacrylonitrile and methyl methacrylate.

Preferred core-shell graft rubbers have a soft core and a hard shell or a hard core, a first soft shell and at least one further hard shell. The incorporation of functional groups such as carbonyl, carboxylic acid, acid anhydride, acid amide, acid imide, carboxylic esters, amino, hydroxyl, epoxy, oxazoline, urethane, urea, lactam or halobenzyl groups is here preferably effected by the addition of suitably functionalized monomers during the polymerization of the last shell. Suitable functionalized monomers include for example maleic acid, maleic anhydride, mono- or diesters of maleic acid, tert-butyl (meth)acrylate, acrylic acid, glycidyl (meth)acrylate and vinyloxazoline. The proportion of monomers having functional groups is generally within the range from 0.1 to 25% by weight, preferably within the range from 0.25 to 15% by weight, based on the total weight of the core-shell graft rubber. The weight ratio of soft to hard constituents is generally within the range from 1:9 to 9:1, preferably within the range from 3:7 to 8:2.

Such rubbers, which enhance the toughness of polyamides, are known per se and described in EP-A-0 208 187 for example.

A further group of suitable impact modifiers are thermoplastic polyester elastomers. Polyester elastomers are segmented copolyetheresters containing long-chain segments, generally derived from poly(alkylene) ether glycols, and short-chain segments, derived from low molecular weight diols and dicarboxylic acids. Such products are known per se and are described in the literature, for example in U.S. Pat. No. 3,651,014. Corresponding products are also commercially available under the names of Hytrel® (Du Pont), Arnitel® (Akzo) and Pelprene® (Toyobo Co. Ltd.).

It will be appreciated that it is also possible to use mixtures of different rubbers.

As further additives there may be mentioned for example processing aids, stabilizers and oxidation retardants, agents against thermal decomposition and decomposition by ultraviolet light, lubricating and demolding agents, flame retardants, dyes and pigments and plasticizers. The proportion thereof is generally up to 40%, preferably up to 15%, by weight, based on the total weight of the composition.

Pigments and dyes are generally present in amounts of up to 4%, preferably from 0.5 to 3.5%, especially from 0.5 to 3%, by weight.

The pigments for coloring thermoplastics are commonly known, see for example R. Gächter and H. Müller, Taschenbuch der Kunststoffadditive, Carl Hanser Verlag, 1983, pages 494 to 510. The first preferred group of pigments to be mentioned are white pigments such as zinc oxide, zinc sulfide, lead white (2 $PbCO_3$, $Pb(OH)_2$), lithopone, antimony white and titanium dioxide. Of the two most common crystal polymorphs (rutile and anatase) of titanium dioxide, the rutile form is preferred for use as white pigment for the molding compositions of the invention.

Black pigments which can be used according to the invention are iron oxide black ($Fe_3O_4$), spinel black (Cu(Cr, Fe)$_2O_4$), manganese black (mixture of manganese dioxide, silicon dioxide and iron oxide), cobalt black and antimony black and also, particularly preferably, carbon black, which is usually used in the form of furnace or gas black (see G. Benzing, Pigmente für Anstrichmittel, Expert-Verlag (1988), p. 78ff).

It will be appreciated that inorganic color pigments such as chromium oxide green or organic color pigments such as azo pigments and phthalocyanines can be used according to the invention to obtain certain hues. Such pigments are generally commercially available.

It can further be of advantage to use the above-mentioned pigments or dyes in a mixture, for example carbon black with copper phthalocyanines, since this generally facilitates the dispersion of color in the thermoplastic.

Oxidation retardants and thermal stabilizers which can be added to the thermoplastic compositions of the invention include for example halides of metals of group of the periodic table, e.g., sodium halides, potassium halides, lithium halides, optionally in conjunction with copper(I) halides, for example chlorides, bromides or iodides. The halides, especially of copper, may also contain electron-rich p-ligands. Examples of such copper complexes are copper halide complexes with triphenylphosphine, for example. It is further possible to use zinc fluoride and zinc chloride. Other possibilities are sterically hindered phenols, hydroquinones, substituted representatives of this group, secondary aromatic amines, optionally in conjunction with phosphorus-containing acids and salts thereof, and mixtures of these compounds, preferably in a concentration up to 1% by weight, based on the weight of the mixture.

Examples of UV stabilizers are various substituted resorcinols, salicylates, benzotriazoles and benzophenones, which are generally used in amounts of up to 2% by weight.

Lubricating and demolding agents, which are generally included in the thermoplastic material in amounts of up to 1% by weight, are stearic acid, stearyl alcohol, alkyl stearates and N-alkylstearamides and also esters of pentaerythritol with long-chain fatty acids. It is also possible to use salts of calcium, of zinc or of aluminum of stearic acid and also dialkyl ketones, for example distearyl ketone.

The present invention further provides a polyamide producible by one of the foregoing processes.

The examples which follow illustrate the invention.

EXAMPLES

Catalyst Preparation

General Procedure

Catalyst 1 Beta-zeolite Powder

The catalyst used was a beta-zeolite from Uetikon (Zeokat-Beta) having the following composition: $SiO_2$=91%, $Al_2O_3$=7.8%, $Na_2O$=0.5%, $K_2O$=0.7%, BET surface area=700 $m^2/g$, pore size in Å=7.6×6.7; 5.5×5.5, particle size 0.2–0.5 μm.

Catalyst 2 Beta-zeolite Extrudates 220 g of β-zeolite from Example 1 were kneaded with 5% of Walocel® and 230 g of water for 45 minutes. The material was then molded under a pressure of 70 bar into 2 mm extrudates. These were dried at 110° C. and calcined at 500° C. for 16 h.

195 g of these extrudates were exchanged with 3 liters of 20% strength $NH_4Cl$ solution at 80° C. for 2 h and then washed with 10 l of water. Thereafter a second exchange was effected again with 3 l of 20% strength NH4Cl solution at 80° C. /2 h and the product was washed Cl-free. Drying at 110° C. was followed by 5 h of calcination at 500° C.

Catalyst 3 Sheet-silicate Type K10®

K10® is an acid-treated montmorillonite from Süd-Chemie. It has a BET surface area of 180–220 $m^2/g$ and an ion exchange equivalent of 40–50 meq/100 g.

Catalysts 4 and 5 $TiO_2$ Extrudates of 100% and 84% Anatase, Respectively

Preparation is in line with the description in Ertl, Knözinger, Weitkamp: "Handbook of heterogeneous catalysis", VCH Weinheim, 1997; page 98ff. The $TiO_2$ polymorphs described as particularly preferred in the preceding description were mixed with water, silica sol and glycerol, extruded and calcined at 550° C.

Catalyst 6 Titanium Dioxide/tungsten Oxide Catalyst

The catalyst used was obtained by intimately mixing the commercially available titanium dioxide VKR 611 (from Sachtleben) with tungsten oxide and subsequent extrusion as per Example 2 or 4.

It has the following specification: 20% by weight of $WO_3$, 80% by weight of $TiO_2$; BET surface area=73 $m^2/g$, total acidity ($PK_a$=6.8)=0.56 mmol/g; total acidity ($PK_a$=−3)= 0.035 mmol/g.

The synthesis mixtures of ε-aminocapronitrile (ACN) and water in a molar mixing ratio within the range from 1:1 to 1:10, selectively with or without acid, are introduced into a 1 L autoclave after complete thorough mixing.

When catalyst material is used, the autoclave has installed in it either exclusively a catalyst granule bed or a bed consisting of catalyst granules and Raschig ring packing elements. Use is made of strand-shaped $TiO_2$ catalysts from 0.5 to 6 mm in diameter and from 1 to 10 mm in length and having a specific surface area of about 50 $m^2/g$.

The autoclave is sealed and inertized with nitrogen by repeated pressurization with subsequent decompression.

The purity of the aminocapronitrile used is 99%. The acid weight percentage is based on the amount of aminocapronitrile used.

Sample Preparation and Analysis

The relative viscosity (RV), a measure of the molecular weight buildup and the degree of polymerization, is measured in a solution in 96% strength sulfuric acid at 25° C. using an Ubbelohde viscometer. The polyamide concentration is 1 g/100 ml for extracted material and 1.1 g/100 ml for unextracted polymer. Unextracted polymers are dried under reduced pressure for 20 hours prior to analysis. For extraction, the chips are stirred under reflux with water.

Examples 1.1–1.8

A synthesis mixture (180 g) having an ACN:water mixing ratio of $ACN:H_2O$=1:2 or $ACN:H_2O$=1:4 is heated in the reactor to 270° C. over 75 minutes while the pressure is controlled to 18 bar using a pressure relief valve. The catalyst granules (400 g) cover the synthesis mixture completely.

After a reaction time of 1 hour at 18 bar, the autoclave is let down over an hour to ambient pressure (1 bar) and then emptied in strand form. For comparison (Comparative Examples C 1.1 and C 1.6), the above-described process is carried out similarly but without catalyst.

| Example | Molar ratio of $ACN:H_2O$ | Acid [% by weight] | Metal oxide | Relative viscosity |
|---|---|---|---|---|
| C 1.1 | 1:2 | — | — | 1.0 |
| 1.1 | 1:2 | — | $TiO_2$ | 1.62 |
| 1.2 | 1:2 | 0.1% $H_3PO_3$ | $TiO_2$ | 1.56 |
| 1.3 | 1:2 | 0.12% $H_2SO_4$ | $TiO_2$ | 1.46 |
| 1.4 | 1:2 | 0.05% $H_3PO_3$ | $TiO_2$ | 1.70 |
| 1.5 | 1:2 | 0.03% $H_2SO_4$ | $TiO_2$ | 1.65 |
| C 1.6 | 1:4 | — | — | 1.00 |
| 1.6 | 1:4 | — | $TiO_2$ | 1.77 |
| 1.7 | 1:4 | 0.05% $H_3PO_3$ | $TiO_2$ | 1.89 |
| 1.8 | 1:4 | 0.03% $H_2SO_4$ | $TiO_2$ | 1.78 |

Example 2.1

A synthesis mixture (180 g) having a molar mixing ratio of $ACN:H_2O$=1:1 is heated in the reactor to 270° C. over 75 minutes while the pressure is controlled to 18 bar using a pressure relief valve. The catalyst granules (400 g) cover the synthesis mixture completely. After a reaction time of 3 hours at 18 bar, the autoclave is let down to ambient pressure (1 bar) over an hour, the synthesis mixture is postcondensed at 270° C. in a stream of nitrogen for 3 hours and then extruded in strand form into a waterbath. For comparison (Comparative Example C 2.1), the above-described process is carried out similarly but without catalyst.

| Example | Metal oxide | Rel. viscosity |
| --- | --- | --- |
| C 2.1 | — | 1.00 |
| 2.1 | TiO$_2$ | 1.37 |

Examples 3.1–3.2

A synthesis mixture (180 g) having a molar mixing ratio of ACN:H$_2$O=1:2.5 is heated in the reactor to 270° C. over 75 minutes while the pressure is controlled to 18 bar using a pressure relief valve. The catalyst granules (400 g) cover the synthesis mixture completely. After a reaction time of 1 hour at 18 bar, the autoclave is let down to ambient pressure (1 bar) over an hour, the synthesis mixture is postcondensed at 270° C. in a stream of nitrogen for 1 hour and then extruded into a waterbath. For comparison (Comparative Example C 3.1), the above-described process is carried out similarly but without catalyst.

| Example | Acid [% by weight] | Metal oxide | Rel. viscosity |
| --- | --- | --- | --- |
| C 3.1 | — | — | 1.00 |
| C 3.2 | 0.02% H$_3$PO$_3$ | — | 1.08 |
| 3.1 | — | TiO$_2$ | 1.84 |
| 3.2 | 0.05% H$_3$PO$_3$ | TiO$_2$ | 1.90 |

Example 4.1

A synthesis mixture (180 g) having an ACN:water mixing ratio of ACN:H$_2$O=1:4 is heated in the reactor to 270° C. over 75 minutes while the pressure is controlled to 18 bar using a pressure relief valve. The catalyst granules (400 g) cover the synthesis mixture completely. After a reaction time of 45 minutes at 18 bar, the autoclave is let down over 10 minutes to ambient pressure (1 bar) and then emptied in strand form. The relative viscosity of the product is designated RV (precondensate). The product is then tempered for 48 hours in a stream of nitrogen at 160° C. The viscosity of the tempered product is designated RV (temper).

Example 5.1

A synthesis mixture (180 g) having an ACN:water mixing ratio of ACN:H$_2$O=1:4 is heated in the reactor to 270° C. over 75 minutes while the pressure is controlled to 18 bar using a pressure relief valve. The catalyst granules (400 g) cover the synthesis mixture completely. On attainment of the final temperature of 270° C. the autoclave is let down over 10 minutes to ambient pressure (1 bar) and then emptied in strand form. The relative viscosity of the product is designated RV (precondensate). The product obtained is then tempered for 48 hours in a stream of nitrogen at 160° C. The viscosity of the tempered product is designated RV (temper).

Example 6.1

The autoclave contains a bed mixture consisting of 100 g of catalyst granules and 340 g of Raschig rings (diameter and length: 6 mm). 250 g of an ACN:water synthesis mixture having a molar mixing ratio of 1:4 are heated to 270° C. over 1 hour while the pressure is controlled to 18 bar using a pressure relief valve. On attainment of the final temperature of 270° C. the autoclave is let down over 10 minutes to ambient pressure (1 bar) and then emptied in strand form. The relative viscosity of the product is designated RV (precondensate). The product obtained is then heated with water (30 g of water per 100 g of reaction product) in the autoclave without catalyst to 260° C. and postcondensed for 3 hours in a stream of nitrogen at ambient pressure. The viscosity of the postcondensed product is designated RV (postcondensate).

For comparison (Comparative Examples C 4.1, C 5.1 and C 6.1), the above-described processes 4.1, 5.1 and 6.1 are carried out without catalyst. Since the reaction of the synthesis mixture in the absence of the catalyst did not produce a solid, chippable product, no postcondensation or tempering was carried out.

| Example | Metal oxide | RV (pre-condensate) | RV (post-condensate) | RV (temper) |
| --- | --- | --- | --- | --- |
| C 4.1 | — | 1.00 | — | — |
| 4.1 | TiO$_2$ | 1.59 | — | 2.29 |
| C 5.1 | — | 1.00 | — | — |
| 5.1 | TiO$_2$ | 1.61 | — | 2.16 |
| C 6.1 | — | 1.00 | — | — |
| 6.1 | TiO$_2$ | — | 1.49 | — |

We claim:
1. A batch process for producing a polyamide by reaction of a mixture comprising at least one aminonitrile, and optionally monomers useful for polyamide production, with water, which comprises the following steps:
   (1) reacting the mixture with water at a temperature from 90 to 400° C. and a pressure from 0.1 to 35×10$^6$ Pa to obtain a reaction mixture,
   (2) further reacting the reaction mixture at a temperature from 150 to 400° C. and a pressure which is lower than the pressure in step 1, the temperature and pressure being selected so as to obtain a first gas phase and a first liquid or a first solid phase or a mixture of first solid and first liquid phase, and the first gas phase is separated from the first liquid or the first solid phase or from the mixture of first liquid and first solid phase, and
   (3) admixing the first liquid or the first solid phase or the mixture of first liquid and first solid phase with a gaseous or liquid phase comprising water at a temperature from 150 to 370° C. and a pressure from 0.1 to 30×10$^6$ Pa to obtain a product mixture,
   wherein step (1) is carried out in the presence of a Brönsted acid catalyst selected from a beta-zeolite catalyst, a sheet-silicate catalyst or a fixed bed catalyst consisting essentially of TiO$_2$ comprising from 70 to 100% by weight of anatase and from 0 to 30% by weight of rutile and in which up to 40% by weight of the titanium dioxide may be replaced by tungsten oxide, and steps (2) and (3) may be carried out in the presence of this catalyst.
2. A batch process for producing a polyamide by reaction of a mixture comprising at least one aminonitrile, and optionally monomers useful for polyamide production, with water, which comprises the following steps:
   (1) reacting the mixture with water at a temperature from 90 to 400° C. and a pressure from 0.1 to 35×10$^6$ Pa to obtain a reaction mixture,
   (2) further reacting the reaction mixture at a temperature from 150 to 400° C. and a pressure which is lower than the pressure in step 1, the temperature and pressure being selected so as to obtain a first gas phase and a first liquid or a first solid phase or a mixture of first solid and first liquid phase, and the first gas phase is separated from the first liquid or the first solid phase or from the mixture of first liquid and first solid phase, and (3) admixing the first liquid or the first solid phase or the mixture of first liquid and first solid phase with a gaseous or liquid phase comprising water at a temperature from 150 to 370° C. and a pressure from 0.1 to 30×10$^6$ Pa to obtain a product mixture, (4) postcondensing the product mixture at a temperature from 200 to 350° C. and a pressure which is lower than the pressure of step 3, the temperature and pressure being selected so as to obtain a second, water- and ammonia-comprising gas phase and a second liquid or second solid phase or a mixture of second liquid and second solid phase, which each comprise the polyamide, wherein step (1) is carried out in the presence of a Brönsted acid catalyst selected from a beta-zeolite catalyst, a sheet-silicate catalyst or a fixed bed catalyst consisting essentially of TiO$_2$ comprising from 70 to 100% by weight of anatase and from 0 to 30% by weight of rutile and in which up to 40% by weight of the titanium dioxide may be replaced by tungsten oxide, and steps (2) and (3) may be carried out in the presence of this catalyst.

3. A process as claimed in claim 1, wherein, in step 3, the gaseous or liquid phase comprising water is added in an amount from 50 to 1500 ml of water per 1 kg of first liquid or first solid phase or mixture of first liquid and first solid phase.

4. A batch process for producing a polyamide by reaction of a mixture comprising at least one aminonitrile, and optionally monomers useful for polyamide production, with water, which comprises the following steps:

(1) reacting the mixture with water at a temperature from 90 to 400° C. and a pressure from 0.1 to 35×10$^6$ Pa to obtain a reaction mixture, (2) further reacting the reaction mixture at a temperature from 150 to 400° C. and a pressure which is lower than the pressure in step 1, the temperature and pressure being selected so as to obtain a first gas phase and a first liquid or a first solid phase or a mixture of first solid and first liquid phase, and the first gas phase is separated from the first liquid or the first solid phase or from the mixture of first liquid and first solid phase, and (3) postcondensing the first liquid or the first solid phase or the mixture of first liquid and first solid phase at a temperature from 200 to 350° C. and a pressure which is lower than the pressure of step 3, the temperature and pressure being selected so as to obtain a second, water- and ammonia-comprising gas phase and a second liquid or second solid phase or a mixture of second liquid and second solid phase, which each comprise the polyamide, wherein step (1) is carried out in the presence of a Brönsted acid catalyst selected from a beta-zeolite catalyst, a sheet-silicate catalyst or a fixed bed catalyst consisting essentially of TiO$_2$ comprising from 70 to 100% by weight of anatase and from 0 to 30% by weight of rutile and in which up to 40% by weight of the titanium dioxide may be replaced by tungsten oxide, and step (2) may be carried out in the presence of this catalyst.

5. A process as claimed in claim 1, wherein the temperature and pressure in step 1 or in step 3 or in both step 1 and step 3 are selected so as to obtain a liquid or a solid phase or a mixture of liquid and solid phase and a gaseous phase, and the gaseous phase is separated off.

6. A process as claimed claim 1, wherein in step 3, the gaseous or liquid phase comprising water is added in an amount from 50 to 1500 ml of water per 1 kg of first liquid or first solid phase or mixture of first liquid and first solid phase.

7. A process as claimed in claim 1, wherein the catalyst is removed from the synthesis mixture after step 2.

8. A process as claimed in claim 1, wherein at least one of the gas phases obtained in the respective steps is recycled into at least one of the preceding steps.

9. A process as claimed in claim 1, wherein the aminonitrile used is an ω-aminoalkyl nitrile having an alkylene moiety (—CH$_2$—) of from 4 to 12 carbon atoms or an aminoalkylaryl nitrile having from 8 to 13 carbon atoms.

10. A process as claimed in claim 1, wherein the following mixture is used:

from 50 to 99.99% by weight of 6-aminocapronitrile, from 0.01 to 50% by weight of at least one dicarboxylic acid selected from the group consisting of aliphatic C$_4$–C$_{10}$-α, ω-dicarboxylic acids, aromatic C$_8$–C$_{12}$-dicarboxylic acids and C$_5$–C$_8$-cycloalkanedi-carboxylic acids, from 0 to 50% by weight of an α, ω-diamine having 4–10 carbon atoms, from 0 to 50% by weight of an α, ω-C$_2$–C$_{12}$-di-nitrile, and from 0 to 50% by weight of an α, ω-C$_5$–C$_{12}$-amino acid or of the corresponding lactam, from 0 to 10% by weight of at least one inorganic acid or salt thereof, the individual weight percentages adding up to 100%.

11. A process as claimed in claim 1, wherein a chain lengthening or a chain branching or a combination thereof is carried out following steps (1) to (3) or (4).

* * * * *